(12) United States Patent
Zhou et al.

(10) Patent No.: US 11,200,899 B2
(45) Date of Patent: Dec. 14, 2021

(54) VOICE PROCESSING METHOD, APPARATUS AND DEVICE

(71) Applicant: Baidu Online Network Technology (Beijing) Co., Ltd., Beijing (CN)

(72) Inventors: Renquan Zhou, Beijing (CN); Xiaonan He, Beijing (CN); Qiang Ju, Beijing (CN); Gang Zhang, Beijing (CN); Zongliang Wen, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 184 days.

(21) Appl. No.: 16/674,176

(22) Filed: Nov. 5, 2019

(65) Prior Publication Data
US 2020/0243085 A1 Jul. 30, 2020

(30) Foreign Application Priority Data
Jan. 28, 2019 (CN) .......................... 201910082469.7

(51) Int. Cl.
*G10L 15/22* (2006.01)
*G10L 15/30* (2013.01)
*G10L 15/26* (2006.01)

(52) U.S. Cl.
CPC .............. *G10L 15/22* (2013.01); *G10L 15/26* (2013.01); *G10L 15/30* (2013.01); *G10L 2015/223* (2013.01)

(58) Field of Classification Search
CPC ......... G10L 15/26; G10L 15/30; G10L 15/22; G10L 15/1815; G10L 15/1822; G10L 2015/223; G10L 2105/226; G10L 2015/227; G10L 2015/228; G06N 5/022; G06N 20/00; G06N 3/006; G06N 5/003; G06N 5/02; G06N 5/04; G06N 5/046;
(Continued)

(56) References Cited

U.S. PATENT DOCUMENTS

| 2010/0009719 A1* | 1/2010 | Oh | ................... H04N 21/41407 455/563 |
| 2014/0136187 A1* | 5/2014 | Wolverton | .............. G10L 15/22 704/9 |

(Continued)

FOREIGN PATENT DOCUMENTS

| CN | 1484463 A | 3/2004 |
| CN | 101362334 | 2/2009 |

(Continued)

*Primary Examiner* — Vijay B Chawan
(74) *Attorney, Agent, or Firm* — Harness, Dickey & Pierce, P.L.C.

(57) ABSTRACT

Embodiments of the present disclosure provides a voice processing method, apparatus and device, where the method includes: acquiring, by a terminal device, first voice information; and acquiring, by the terminal device, response information corresponding to the first voice information, and performing an operation corresponding to the response information according to a type of the response information, where the type of the response information is at least one of a voice type, a text type, an image type, a video type, and a program operation type, which improves the flexibility of the voice processing.

18 Claims, 6 Drawing Sheets

(58) Field of Classification Search
CPC . G06N 7/005; G06F 16/3329; G06F 16/3344; G06F 40/30; G06F 40/205; G06F 40/211; G06F 40/237; G06F 40/253; G06F 40/284; G06F 40/35
USPC .......................... 704/270, 270.1, 275, 231, 9
See application file for complete search history.

(56) References Cited

U.S. PATENT DOCUMENTS

| | | | | |
|---|---|---|---|---|
| 2014/0304257 A1* | 10/2014 | Ben Shahar | ........ | G06F 16/3344 707/723 |
| 2015/0074095 A1* | 3/2015 | Enders | .................... | G06F 40/40 707/725 |
| 2015/0319303 A1* | 11/2015 | Saylor | .................... | G06F 9/451 455/415 |
| 2016/0124951 A1* | 5/2016 | Barker | ................ | G06F 16/3334 706/12 |
| 2016/0196334 A1* | 7/2016 | Bastide | ............... | G06F 16/3344 707/776 |
| 2017/0091312 A1* | 3/2017 | Ajmera | ............... | G06F 16/3329 |
| 2017/0118349 A1* | 4/2017 | Saylor | ................... | H04M 3/493 |
| 2017/0169101 A1* | 6/2017 | Walia | ................. | G06F 16/3344 |
| 2017/0243107 A1* | 8/2017 | Jolley | ...................... | G06N 5/02 |
| 2017/0286396 A1* | 10/2017 | Sandor | ................... | G06F 40/35 |
| 2018/0004729 A1* | 1/2018 | Qiu | ........................ | G06F 40/205 |
| 2018/0165099 A1* | 6/2018 | Nagasaka | ............. | H04L 12/282 |
| 2018/0219807 A1* | 8/2018 | Thinguldstad | ...... | G06F 16/3329 |
| 2019/0050239 A1* | 2/2019 | Caldwell | ............... | G06F 11/079 |
| 2019/0122124 A1* | 4/2019 | Kartchner | ............. | G06N 5/022 |

FOREIGN PATENT DOCUMENTS

| | | |
|---|---|---|
| CN | 102138175 A | 7/2011 |
| CN | 105745615 A | 7/2016 |
| CN | 106157950 A | 11/2016 |
| CN | 106971741 A | 7/2017 |

* cited by examiner

VOICE PROCESSING METHOD, APPARATUS AND DEVICE

CROSS-REFERENCE TO RELATED APPLICATION

This application claims priority to Chinese Patent Application No. 201910082469.7, filed on Jan. 28, 2019, which is hereby incorporated by reference in its entirety.

TECHNICAL FIELD

Embodiments of the present disclosure relate to the field of computer technologies, and in particular, to a voice processing method, apparatus and device.

BACKGROUND

At present, many terminal devices (such as mobile phones, tablet computers, or the like) are provided with an intelligent voice service, and the terminal devices can receive voice information input by a user through the intelligent voice service, and perform a response operation according to the voice information.

In an actual application process, the response operation performed by the terminal device according to the voice information may include: responding to the voice information input by the user, making a call or transmitting information according to the voice information input by the user, or the like. In the prior art, after the intelligent voice service in the terminal device is awakened, the terminal device may monitor the voice information input by the user. After detecting the voice information, the terminal device may acquire response information corresponding to the voice information, and perform an operation corresponding to the response information. In a process of the terminal device acquiring the response information and performing the operation corresponding to the response information, the terminal device cannot detect the voice information input by the user, resulting in poor flexibility of the voice processing.

SUMMARY

Embodiments of the present disclosure provide a voice processing method, apparatus and device, which improve the flexibility of the voice processing.

In a first aspect, an embodiment of the present disclosure provides a voice processing method, including:

acquiring, by a terminal device, first voice information; and acquiring, by the terminal device, response information corresponding to the first voice information, and performing an operation corresponding to the response information according to a type of the response information, where the type of the response information is at least one of a voice type, a text type, an image type, a video type, and a program operation type.

In a possible implementation, the acquiring, by a terminal device, first voice information, includes:

acquiring, by the terminal device, the first voice information through a first execution object; and the acquiring, by the terminal device, response information corresponding to the first voice information, and performing an operation corresponding to the response information according to a type of the response information, includes:

acquiring, by the terminal device, the response information corresponding to the first voice information through a second execution object, and performing the operation corresponding to the response information according to the type of the response information through the second execution object, where the first execution object and the second execution object execute in parallel.

In a possible implementation, the first execution object is a first thread, and the second execution object is a second thread.

In a possible implementation, the first execution object is a first hardware processing component, and the second execution object is a second hardware processing component.

In a possible implementation, the acquiring, by the terminal device, the response information corresponding to the first voice information through a second execution object, includes:

transmitting, by the terminal device, request information to a server, where the request information includes voice representation information, and the voice representation information is determined according to the first voice information; and receiving, by the terminal device, the response information transmitted by the server.

In a possible implementation, the voice representation information includes the first voice information; and correspondingly, the response information is determined by the server according to the first voice information.

In a possible implementation, before the transmitting, by the terminal device, request information to a server, the method further includes:

acquiring, by the terminal device, text information and an audio characteristic of the first voice information; and correspondingly, the voice representation information includes the text information and the audio characteristic; the response information is determined by the server according to the text information and the audio characteristic.

In a possible implementation, the audio characteristic includes at least one of a voiceprint, a volume, a length, a sound wave amplitude, and a sound wave frequency of the first voice information.

In a possible implementation, acquiring, by the terminal device, the response information corresponding to the first voice information through a second execution object, includes:

determining, by the terminal device, whether the first voice information is a real user statement through the second execution object; and when the terminal device determines that the first voice information is a real user statement, generating, by the terminal device, the response information through the second execution object.

In a possible implementation, the determining, by the terminal device, whether the first voice information is a real user statement through the second execution object, includes:

acquiring, by the terminal device, characteristic information of the first voice information through the second execution object, where the characteristic information includes at least one of the following: an audio characteristic of the first voice information, a text characteristic of the first voice information, text information of the first voice information, context information of the first voice information, and an interaction behavior characteristic of a user, where the interaction behavior characteristic is configured to indicate a behavior characteristic of the user inputting the voice information in the terminal device;

acquiring, by the terminal device, a probability that the first voice information is a real user statement according to the characteristic information of the first voice information; and determining, by the terminal device, whether the first voice information is a real user statement according to the probability.

In a possible implementation, the performing, by the terminal device, the operation corresponding to the response information according to the type of the response information through the second execution object, includes:

when the type of the response information is a voice type, playing, by the terminal device, the response information of the voice type;

when the type of the response information is a text type or an image type, displaying, by the terminal device, the response information of the text type or the image type;

when the type of the response information is a video type, playing, by the terminal device, the response information of the video type; and when the type of the response information is a program operation type, performing, by the terminal device, a program operation corresponding to the response information.

In a second aspect, an embodiment of the present disclosure provides a voice processing apparatus, including a first acquiring module, a second acquiring module, and an executing module, where the first acquiring module is configured to acquire first voice information;

the second acquiring module is configured to acquire response information corresponding to the first voice information; and the executing module is configured to perform an operation corresponding to the response information according to a type of the response information, where the type of the response information is at least one of a voice type, a text type, an image type, a video type, and a program operation type.

In a possible implementation, the first acquiring module is specifically configured to acquire the first voice information through a first execution object;

the second acquiring module is specifically configured to acquire the response information corresponding to the first voice information through a second execution object, where the first execution object and the second execution object execute in parallel; and the executing module is specifically configured to perform the operation corresponding to the response information according to the type of the response information through the second execution object.

In a possible implementation, the first execution object is a first thread, and the second execution object is a second thread.

In a possible implementation, the first execution object is a first hardware processing component, and the second execution object is a second hardware processing component.

In a possible implementation, the apparatus further includes a transmitting module and a receiving module, where the transmitting module is configured to transmit request information to a server, where the request information includes voice representation information, and the voice representation information is determined according to the first voice information; and the receiving module is configured to receive the response information transmitted by the server.

In a possible implementation, the voice representation information includes the first voice information; and correspondingly, the response information is determined obtained by the server according to the first voice information.

In a possible implementation, the apparatus further includes a third acquiring module, where the third acquiring module is configured to acquire text information and an audio characteristic of the first voice information before the terminal device transmits the request information to the server; and correspondingly, the voice representation information includes the text information and the audio characteristic; the response information is determined by the server according to the text information and the audio characteristic.

In a possible implementation, the audio characteristic includes at least one of a voiceprint, a volume, a length, a sound wave amplitude, and a sound wave frequency of the first voice information.

In a possible implementation, the second acquiring module is specifically configured to:

determine whether the first voice information is a real user statement through the second execution object; and generate the response information through the second execution object when it is determined that the first voice information is a real user statement.

In a possible implementation, the second acquiring module is specifically configured to:

acquire characteristic information of the first voice information through the second execution object, where the characteristic information includes at least one of the following: an audio characteristic of the first voice information, a text characteristic of the first voice information, text information of the first voice information, context information of the first voice information, and an interaction behavior characteristic of a user, where the interaction behavior characteristic is configured to indicate a behavior characteristic of the user inputting the voice information in the terminal device;

acquire a probability that the first voice information is a real user statement according to the characteristic information of the first voice information; and determine whether the first voice information is a real user statement according to the probability.

In a possible implementation, the executing module is specifically configured to:

when the type of the response information is a voice type, play the response information of the voice type;

when the type of the response information is a text type or an image type, display the response information of the text type or the image type;

when the type of the response information is a video type, play the response information of the video type; and when the type of the response information is a program operation type, perform a program operation corresponding to the response information.

In a third aspect, an embodiment of the present disclosure provides a voice processing device, including: at least one processor, where the processor is coupled to a memory;

the memory is configured to store a computer program;

the processor is configured to execute the computer program stored in the memory to cause the processor to execute the method according to any one of the above first aspect.

In a fourth aspect, an embodiment of the present disclosure provides a readable storage medium, where the computer readable storage medium stores a computer executed instruction therein, and a processor, when executes the computer executed instruction, implements the voice processing method according to any one of the first aspect.

In the voice processing method, apparatus and device provided by the embodiments of the present disclosure, a terminal device acquires first voice information, acquires response information corresponding to the first voice information, and performs an operation corresponding to the response information according to a type of the response information. In the above process, the terminal device may perform "acquiring the first voice information" and "acquiring the response information corresponding to the first voice information and performing the operation corresponding to the response information according to the type of the response information" in parallel, so that in the process of the terminal device acquiring the response information and performing the operation corresponding to the response information, the terminal device may still monitor the voice information through a first execution object, such that a user can also output new voice information in the process of the terminal device responding to one piece of voice information, which improves the flexibility of the voice processing.

BRIEF DESCRIPTION OF DRAWINGS

In order to more clearly illustrate the technical solutions in the embodiments of the present disclosure or in the prior art, the drawings needed to be used in the description of the embodiments or the prior art will be briefly described below. Obviously, the drawings in the following description are some embodiments of the present disclosure, for those skilled in the art, other drawings can be obtained according to these drawings without any creative efforts.

DESCRIPTION OF EMBODIMENTS

In order to make the objects, technical solutions and advantages of the embodiments of the present disclosure more clear, the technical solutions in the embodiments of the present disclosure will be clearly and completely described in combination with the drawings in the embodiments of the present disclosure. Obviously, the described embodiments are part of the embodiments of the present disclosure, but not all of the embodiments. Based on the embodiments of the present disclosure, all other embodiments obtained by those skilled in the art without creative efforts are within the protection scope of the present disclosure.

Figure 1A:
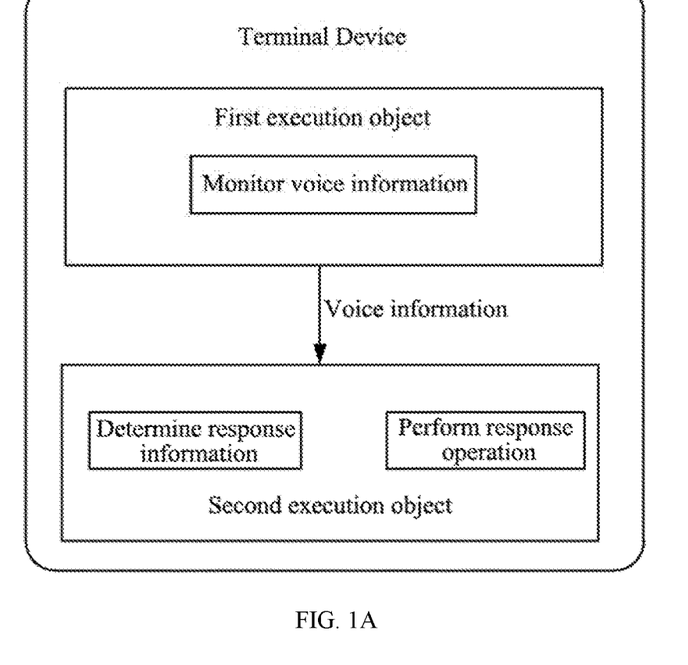
FIG. 1A is an architecture diagram of a voice processing method according to an embodiment of the present disclosure.

FIG. 1A is an architecture diagram of a voice processing method according to an embodiment of the present disclosure. Referring to FIG. 1A, an intelligent voice service is included in a terminal device. The intelligent voice service is in a full-duplex mode. That is, in an operation process of the intelligent voice service, voice information may be monitored through a first execution object, and the first execution object may transmit the monitored voice information to a second execution object. The second execution object may determine response information according to the voice information, and perform a response operation corresponding to the response information. In the above process, the first execution object and the second execution object may execute in parallel, such that in a process of the second execution object determining the response information and performing the response operation, the terminal device may still monitor the voice information through the first execution object, so that in the process of the terminal device responding to one piece of voice information, the user can also output new voice information, which improves the flexibility of the voice processing.

Figure 1B:
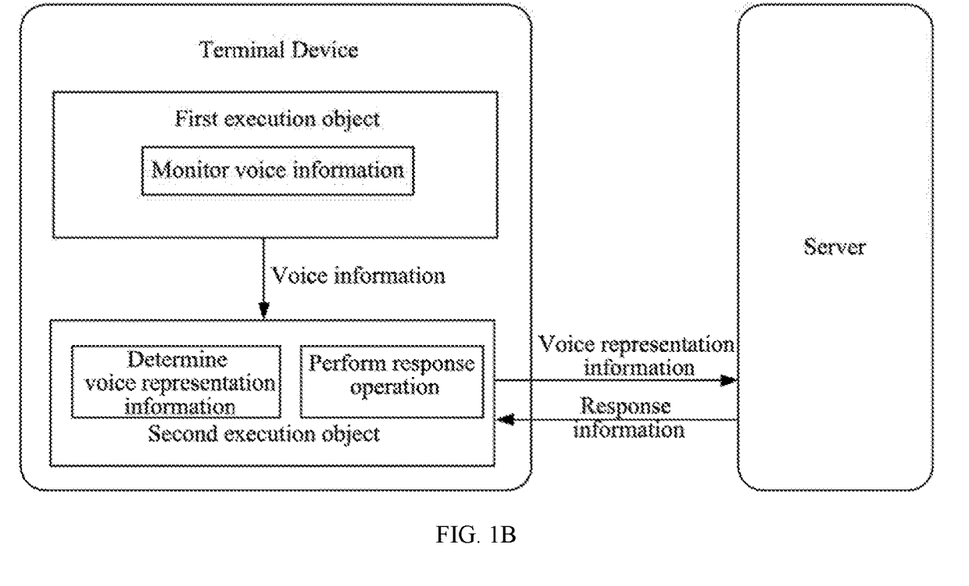
FIG. 1B is an architecture diagram of another voice processing method according to an embodiment of the present disclosure.

FIG. 1B is an architecture diagram of another voice processing method according to an embodiment of the present disclosure. Referring to FIG. 1B, an intelligent voice service is included in a terminal device. In an operation process of the intelligent voice service, voice information may be monitored through a first execution object, and the first execution object may transmit the monitored voice information to a second execution object. The second execution object may determine voice representation information corresponding to the voice information, and transmit the voice representation information to a server, which determines response information according to the voice representation information, and the second execution object may further receive the response information transmitted by the server, and perform a response operation according to the response information. In the above process, the first execution object and the second execution object may execute in parallel, such that in a process of the server determining the response information and the second execution object determining to perform the response operation, the terminal device may still monitor the voice information through the first execution object, so that in the process of the terminal device responding to one piece of voice information, the user can also output new voice information, which improves the flexibility of the voice processing.

It should be noted that, FIG. 1A and FIG. 1B illustrate only two architectures by way of example, and do not limit the architecture. In an actual application process, the architecture of voice processing may be set according to actual needs.

The technical solutions shown in the present application are illustrated in detail below through specific embodiments. It should be noted that the following specific embodiments may be combined with each other, and the same or similar content will not be repeatedly illustrated in different embodiments.

Figure 2:
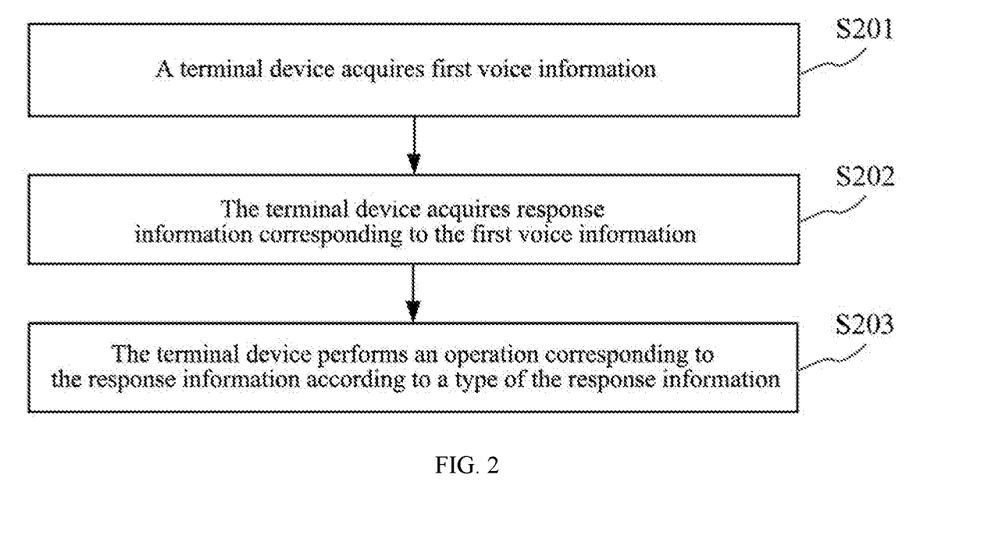
FIG. 2 is a schematic flowchart diagram of a voice processing method according to an embodiment of the present disclosure.

FIG. 2 is a schematic flowchart diagram of a voice processing method according to an embodiment of the present disclosure. Referring to FIG. 2, the method may include:

S201. A terminal device acquires first voice information.

The terminal device involved in the embodiment of the present disclosure has an intelligent voice service. That is, the terminal device may receive voice information input by a user and respond to the voice information.

In an embodiment, the terminal device can be a device such as a mobile phone or a tablet computer.

In an embodiment, at least one microphone is disposed in the terminal device, and the microphone can detect the voice information during a process of the operation of the intelligent voice service in the terminal device.

In an actual application process, the intelligent voice service includes a sleep state and an awaken state, and the user can input a preset instruction in the terminal device to change a state of the intelligent voice service.

For example, the user can perform a long press operation on a preset button in the terminal device to convert the intelligent voice service in the terminal device from the sleep state to the awaken state.

For example, the user can speak a first preset voice (e.g., "Xiao du, Xiao du", "Hi, Xiao du", or the like) to convert the intelligent voice service in the terminal device from the sleep state to the awaken state. The user can also speak a second preset voice (for example, "Go, Xiao du", "All right, Xiao du", or the like) to convert the intelligent voice service in the terminal device from the awaken state to the sleep state.

In an embodiment, the terminal device may acquire the first voice information through a first execution object.

In an embodiment, the first execution object may be a first thread or a first hardware processing component.

For example, the first hardware processing component can be a chip, a processor, or the like.

In an embodiment, when the intelligent voice service in the terminal device is in the awaken state, the microphone can detect the voice information in real time to acquire the first voice information from the microphone.

In an actual application process, the first voice information may be voice information of a user interacting with the terminal device, or may be an ambient noise. For example, the ambient noise may include voice information of other users, or voice information of other devices, or the like.

S202. The terminal device acquires response information corresponding to the first voice information.

In an embodiment, the terminal device may acquire the response information corresponding to the first voice information through a second execution object.

In an embodiment, the second execution object may be a second thread or a second hardware processing component.

For example, the second hardware processing component can be a chip, a processor, or the like.

For example, when the first execution object is the first thread, the second execution object is the second thread. When the first execution object is the first hardware processing component, the second execution object is the second hardware processing component.

In an embodiment, the terminal device generates the response information corresponding to the first voice information through the second execution object.

In an embodiment, the terminal device may also transmit voice representation information corresponding to the first voice information to a server, and then the server determines the response information according to the voice representation information, and transmits the response information to the second execution object of terminal device.

It should be noted that, the process of determining the response information is described in detail in embodiments shown in FIG. 4 to FIG. 7, and details are not described herein again.

S203. The terminal device performs an operation corresponding to the response information according to a type of the response information.

In an embodiment, the terminal device may perform the operation corresponding to the response information according to the type of the response information through the second execution object.

In an embodiment, when the types of the response information are different, processes of performing the operation corresponding to the response information are also different, and at least the following four possible cases may be included:

In a possible case, the type of the response information is a voice type.

In this possible case, the terminal device can play the response information of the voice type. For example, the terminal device plays the response information of the voice type through a voice playing apparatus.

For example, if the first voice information is "What day is it today", the determined response information may be "Today is Friday" of the voice type. Correspondingly, the terminal device can play the response information of the voice type, that is, the terminal device plays the voice of "Today is Friday".

In another possible case, the type of response information is a text type or an image type.

In this possible case, the terminal device displays the response information of the text type or the image type.

For example, it is assumed that the first voice information is "Displaying a photo of Andy Lau", the determined response information is an image of Andy Lau. Correspondingly, the terminal device can display the response information, that is, the terminal device displays the image of Andy Lau.

In yet another possible case, the type of response information is a video type.

In this possible case, the terminal device plays the response information of the video type. The terminal device playing the response information of the video type includes displaying images in a video and playing voices in the video through the voice playing apparatus.

For example, it is assumed that the first voice information is "Playing a video of Journey to the west", the determined response information is the video of Journey to the west. Correspondingly, the terminal device can display images in the video of Journey to the west and play sounds in the video of Journey to the west.

In still another possible case, the type of response information is a program operation type.

In this possible case, the terminal device performs a program operation corresponding to the response information.

In an embodiment, the program operations may include: making a call, sending a short message, opening an application, deleting an application, or the like.

For example, it is assumed that the first voice information is "Calling Xiao Ming", the determined response information is "performing steps of an operation of calling Xiao Ming". Correspondingly, the terminal device can make a call according to a phone number of Xiao Ming in an address book according to the response information.

In the voice processing method provided by the embodiment of the present disclosure, a terminal device acquires first voice information, acquires response information corresponding to the first voice information, and performs an operation corresponding to the response information according to a type of the response information. In the above process, the terminal device may perform "acquiring the first voice information" and "acquiring the response information corresponding to the first voice information and performing the operation corresponding to the response information according to the type of the response information" in parallel, so that in a process of the terminal device acquiring the response information and performing the operation corresponding to the response information, the terminal device may still monitor the voice information through a first execution object, such that a user can also output new voice information in the process of the terminal device responding to one piece of voice information, which improves the flexibility of the voice processing.

Hereinafter, the method shown in the embodiment of FIG. 2 will be described in detail by way of specific examples in combination with FIGS. 3A-3B.

Figure 3A:
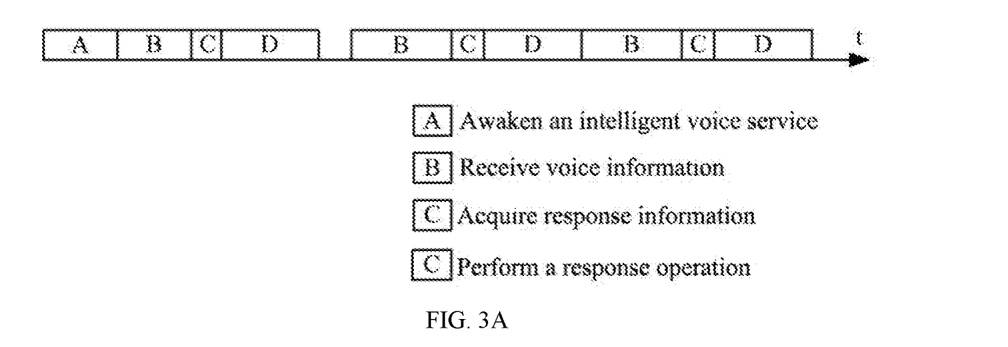
FIG. 3A is a schematic diagram of a voice processing process according to an embodiment of the present disclosure.

FIG. 3A is a schematic diagram of a voice processing process according to an embodiment of the present disclosure. FIG. 3B is a schematic diagram of another voice processing process according to an embodiment of the present disclosure. The schematic diagram of the voice processing process shown in FIG. 3A is a schematic diagram of a processing process using an existing voice processing method, and FIG. 3B is a schematic diagram of a processing process using the voice processing method according to the present application. Referring to FIG. 3A and FIG. 3B, step A represents awakening an intelligent voice service in a terminal device, step B represents that the terminal device receives voice information, step C represents that the terminal device acquires response information, and step D represents that the terminal device performs a response operation.

Referring to FIG. 3A, after awakening the intelligent voice service in the terminal device, step B, step C and step D need to be performed in sequence. That is, for one step B, only after step C and step D corresponding to that step B are accomplished, step B in a next cycle can be performed. In other words, step B cannot be performed in the process of performing step C and step D.

Figure 3B:
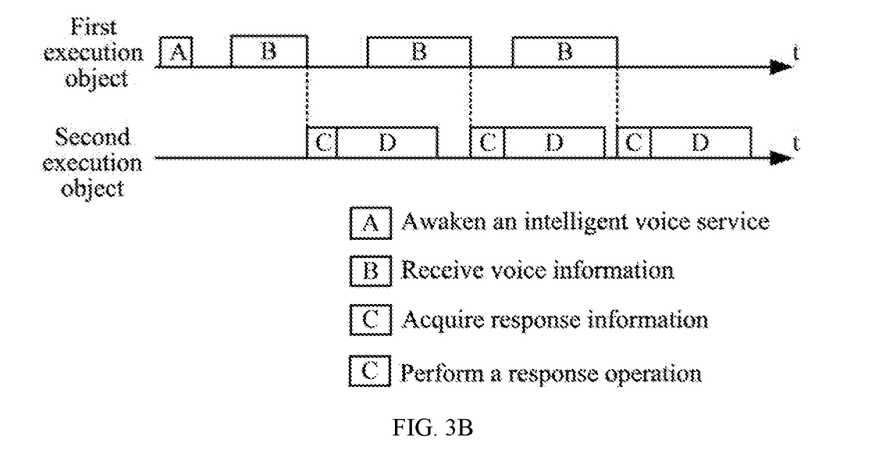
FIG. 3B is a schematic diagram of another voice processing process according to an embodiment of the present disclosure.

Referring to FIG. 3B, after awakening the intelligent voice service in the terminal device, step B may be performed by a first execution object, and step C and step D may be performed by a second execution object, since the first execution object and the second execution object may execute in parallel, therefore, in a cycle, step B, step C and step D are performed in sequence, and in different cycles, step B can be performed in parallel with step C or step D. For example, in FIG. 3B, in the process of performing step D in a first cycle, step B of a second cycle may be performed, and in the process of performing step D in the second cycle, step B of a third cycle may be performed.

In the above process, in the process of the terminal device acquiring the response information and performing the operation corresponding to the response information, the terminal device may still monitor the voice information through the first execution object, such that the user can also output new voice information in the process of the terminal device responding to one piece of voice information, which improves the flexibility of the voice processing.

Based on any one of the above embodiments, the voice processing process will be further described in detail below in combination with FIGS. 4-7.

Figure 4:
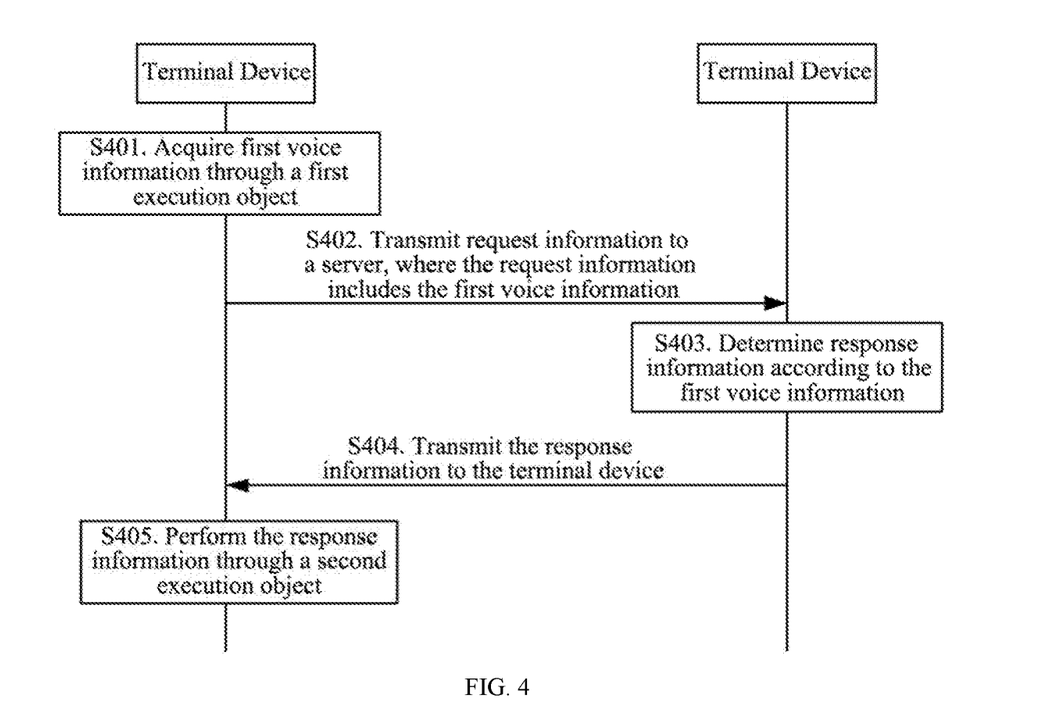
FIG. 4 is a schematic flowchart diagram of another voice processing method according to an embodiment of the present disclosure.

FIG. 4 is a schematic flowchart diagram of another voice processing method according to an embodiment of the present disclosure. Referring to FIG. 4, the method may include:

S401. The terminal device acquires first voice information through a first execution object.

It should be noted that the execution process of S401 can be referred to the execution process of S201, and details are not described herein again.

S402. The terminal device transmits request information to a server, where the request information includes the first voice information.

The request information is configured to request response information corresponding to the first voice information.

In an embodiment, the terminal device may transmit the request information to the server through the first execution object or a second execution object. Of course, the terminal device can also transmit the request information to the server through a third thread.

S403. The server determines the response information according to the first voice information.

In an embodiment, the server may acquire characteristic information of the first voice information, acquire a probability that the first voice information is a real user statement according to the characteristic information of the first voice information, and determine whether the first voice information is a real user statement according to the probability, determine the response information according to the first voice information when it is determined that the first voice information is a real user statement, and determine that the response information is empty when it is determined that the first voice information is not a real user statement, that is, the terminal device does not perform any action according to the response information.

In an embodiment, the characteristic information may include at least one of the following: an audio characteristic of the first voice information, a text characteristic of the first voice information, text information of the first voice information, context information of the first voice information, and an interaction behavior characteristic of the user, the interaction behavior characteristic is configured to indicate a behavior characteristic of the user inputting the voice information in the terminal device.

In an embodiment, if the probability that the first voice information is a real user statement is greater than a first threshold, it is determined that the first voice information is a real user statement. For example, the first threshold may be 0.85 or the like, in an actual application process, the first threshold may be set according to actual needs, which is not specifically limited in the embodiment of the present disclosure.

The process of determining whether the first voice information is a real user statement will be described in detail below in combination with FIG. 5.

Figure 5:
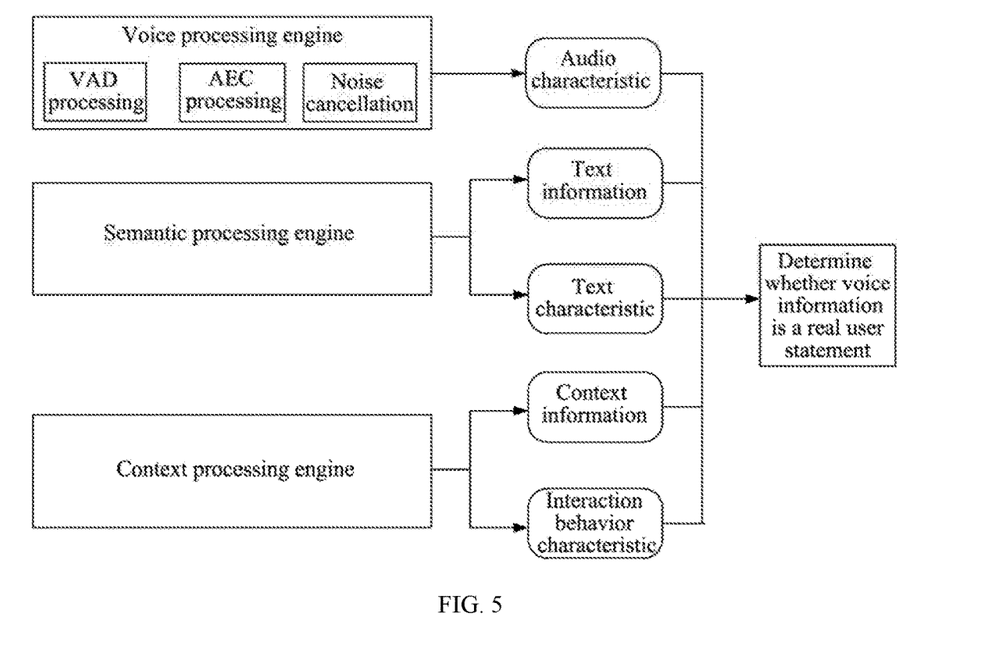
FIG. 5 is a schematic diagram of a voice processing process according to an embodiment of the present disclosure.

FIG. 5 is a schematic diagram of a voice processing process according to an embodiment of the present disclosure. Referring to FIG. 5, processing such as Voice Activity Detection (VAD), voice boundary detection, and Automatic Echo Cancellation (AEC) can be performed on the first voice information through a voice processing engine to obtain an audio characteristic of the first voice information, the audio characteristic of the first voice information may include at least one of a voiceprint, a volume, a length, a sound wave amplitude, and a sound wave frequency of the first voice information.

The first voice information may be processed by a semantic processing engine to obtain text information of the first voice information and a text characteristic of the text information. For example, the text characteristic may include a length of a text, a grammatical structure of the text, or the like.

The first voice information may be processed by a context processing engine to obtain context information of the first voice information and an interaction behavior characteristic of the user. For example, the interaction behavior characteristic of the user may include a duration in which the intelligent voice service in the terminal device is awakened, the number of the voice information collected after the awakening, preference of the user, or the like.

For example, a conversation performing between the user and the terminal device may be as follows:

The user: Xiao du, Xiao du, what's the date today?
The terminal device: Today is Dec. 1, 2018.
The user: What is the weather today?
The terminal device: It's sunny today and the temperature is low.
Other users: Go. [noise]
The terminal device: [Performing no reply, but continuing to monitor the voice information]
The user: What is the weather tomorrow?
The terminal device: It's sunny tomorrow.
TV noise: Every day, every day.
The terminal device: [Performing no reply, but continuing to monitor the voice information]
The user: Retire.
The terminal device: Ok.

Please refer to the above conversation. After the user says "Xiao du, Xiao du", the intelligent voice service in the terminal device is awaken. After the terminal device detects that the user says "what's the date today", the terminal device replies "Today is Dec. 1, 2018". After the terminal device detects that the user says "what is the weather like today", the terminal device replies "It's sunny today and the temperature is low". After the terminal device detects "Go", the terminal device determines that the voice information is not a real user statement, and the terminal device then does not reply, but continues to monitor the voice information. After the terminal device detects that the user says "what's the weather tomorrow", the terminal device replies "It's sunny tomorrow". After the terminal device detects "Every day, every day", the terminal device determines that the voice information is not a real user statement, and the terminal device then does not reply, but continues to monitor the voice information. When the terminal device detects that the user says "Retire", the terminal device then replies "OK" and sets the intelligent voice service to the sleep state, and does not continue to monitor the voice information.

S404. The server transmits the response information to the terminal device.

In an embodiment, the terminal device may receive the response information transmitted by the server through the second execution object.

S405. The terminal device performs the response information through the second execution object.

It should be noted that the execution process of S405 can be referred to the execution process of S203, and details are not described herein again.

In the embodiment shown in FIG. 4, a terminal device acquires first voice information through a first execution object, and the first voice information is processed by a server to obtain response information of the first voice information, and the terminal device receives the response information transmitted by the server through a second execution object, and performs an operation corresponding to the response information through the second execution object. In the above process, the first execution object and the second execution object may execute in parallel, so that in the process of the terminal device acquiring the response information and performing the operation corresponding to the response information, the terminal device may still monitor the voice information through the first execution object, such that the user can also output new voice information in a process of the terminal device responding to one piece of voice information, which improves the flexibility of the voice processing.

Figure 6:
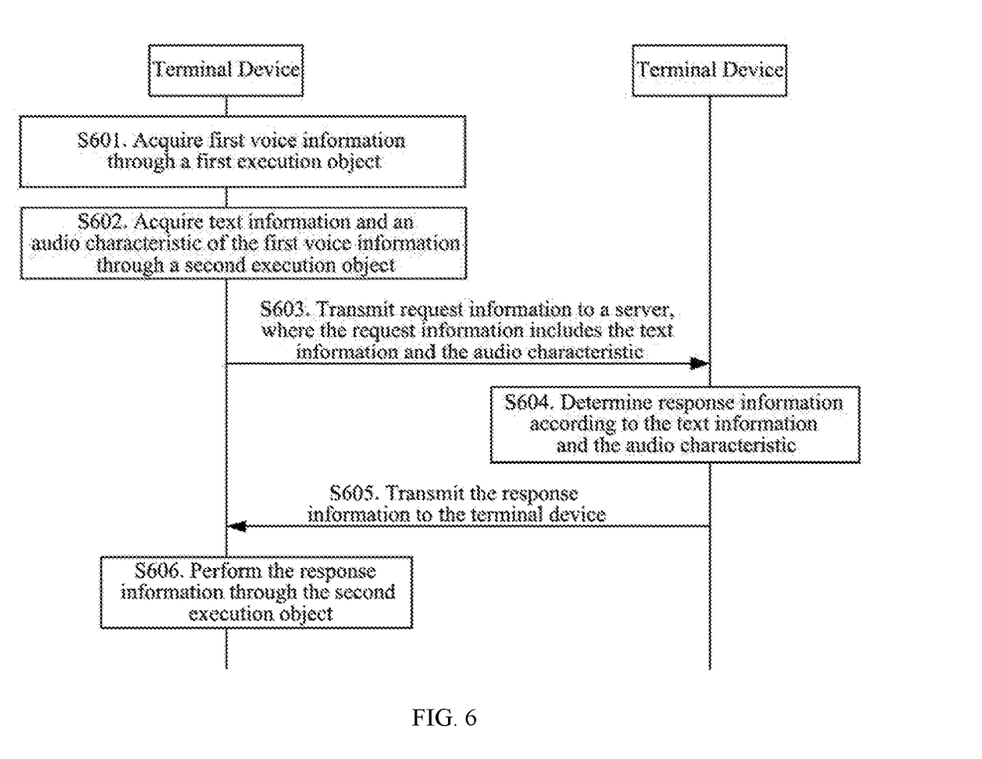
FIG. 6 is a schematic flowchart diagram of yet another voice processing method according to an embodiment of the present disclosure.

FIG. 6 is a schematic flowchart diagram of yet another voice processing method according to an embodiment of the present disclosure. Referring to FIG. 6, the method may include:

S601. The terminal device acquires first voice information through a first execution object.

It should be noted that the execution process of S601 can be referred to the execution process of S201, and details are not described herein again.

S602. The terminal device acquires text information and an audio characteristic of the first voice information through a second execution object.

In an embodiment, the process of the terminal device acquiring the text information and the audio characteristic may be referred to the process of the server acquiring the text information and the audio characteristic in S403, and details are not described herein again.

S603. The terminal device transmits request information to a server, where the request information includes the text information and the audio characteristic.

In an embodiment, the terminal device may transmit the request information to the server through the first execution object or the second execution object. Of course, the terminal device can also transmit the request information to the server through a third thread.

S604. The server determines response information according to the text information and the audio characteristic.

In an embodiment, the server can acquire a text characteristic according to the text information. The server can also acquire context information and an interaction behavior characteristic of a user.

The server may determine whether the first voice information is a real user statement according to at least one of the text information, the audio characteristic, the text characteristic, the context information, or the interaction behavior characteristic of the user, determine the response information according to the first voice information when it is determined that the first voice information is a real user statement, and determine that the response information is empty when it is determined that the first voice information is not a real user statement, that is, the terminal device does not perform any action according to the response information.

S605. The server transmits the response information to the terminal device.

In an embodiment, the terminal device may receive the response information transmitted by the server through the second execution object.

S606. The terminal device performs the response information through the second execution object.

It should be noted that the execution process of S606 can be referred to the execution process of S203, and details are not described herein again.

In the embodiment shown in FIG. 6, a terminal device acquires first voice information through a first execution object, and the terminal device further acquires text information and an audio characteristic of the first voice information through a second execution object, and a server determines response information of the first voice information according to the text information and the audio characteristic, the terminal device receives the response information transmitted by the server through the second execution object, and performs an operation corresponding to the response information through the second execution object. In the above process, the first execution object and the second execution object may execute in parallel, so that in the process of the terminal device acquiring the response information and performing the operation corresponding to the response information, the terminal device may still monitor the voice information through the first execution object, such that the user can also output new voice information in a process of the terminal device responding to one piece of voice information, which improves the flexibility of the voice processing.

Figure 7:
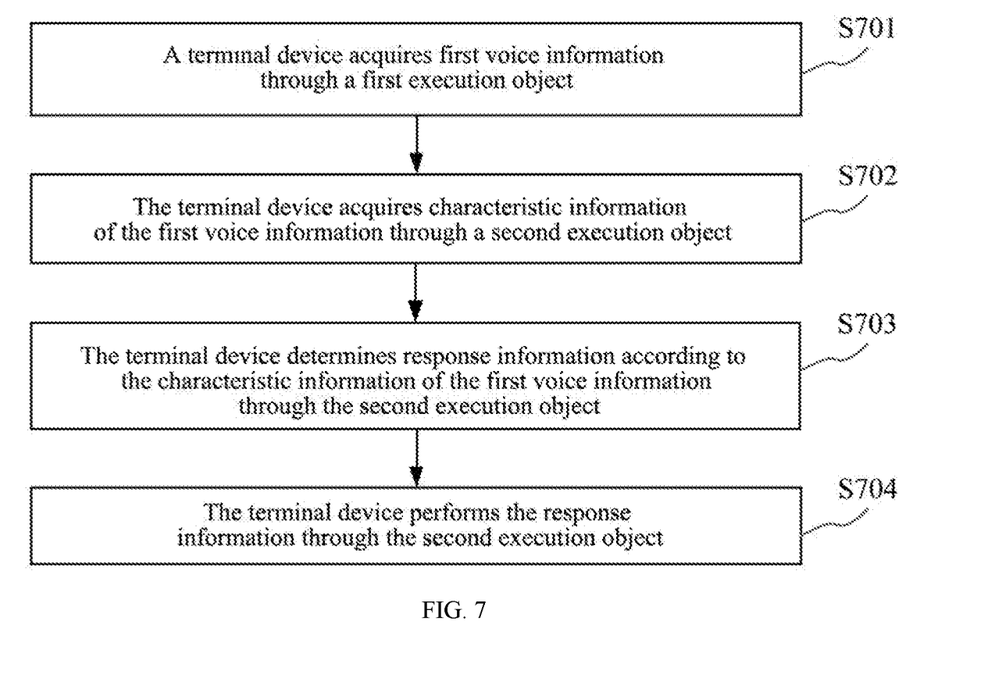
FIG. 7 is a schematic flowchart diagram of still another voice processing method according to an embodiment of the present disclosure.

FIG. 7 is a schematic flowchart diagram of still another voice processing method according to an embodiment of the present disclosure. Referring to FIG. 7, the method may include:

S701. The terminal device acquires first voice information through a first execution object.

It should be noted that the execution process of S701 can be referred to the execution process of S201, and details are not described herein again.

S702. The terminal device acquires characteristic information of the first voice information through a second execution object.

It should be noted that the execution process of S702 can be referred to the process of the server acquiring the characteristic information of the first voice information in S403, and details are not described herein again.

S703. The terminal device determines response information according to the characteristic information of the first voice information through the second execution object.

In an embodiment, the terminal device may acquire a probability that the first voice information is a real user statement according to the characteristic information of the first voice information, and determine whether the first voice information is a real user statement according to the probability, determine the response information according to the first voice information when it is determined that the first voice information is a real user statement, and determine that the response information is empty when it is determined that the first voice information is not a real user statement, that is, the terminal device does not perform any action according to the response information.

S704. The terminal device performs the response information through the second execution object.

It should be noted that the execution process of S704 can be referred to the execution process of S203, and details are not described herein again.

In the embodiment shown in FIG. 7, a terminal device acquires first voice information through a first execution object, acquires response information through a second execution object, and performs an operation corresponding to the response information through the second execution object. In the above process, the first execution object and the second execution object may execute in parallel, so that in the process of the terminal device acquiring the response information and performing the operation corresponding to the response information, the terminal device may still monitor the voice information through the first execution object, such that the user can also output new voice information in a process of the terminal device responding to one piece of voice information, which improves the flexibility of the voice processing.

Figure 8:
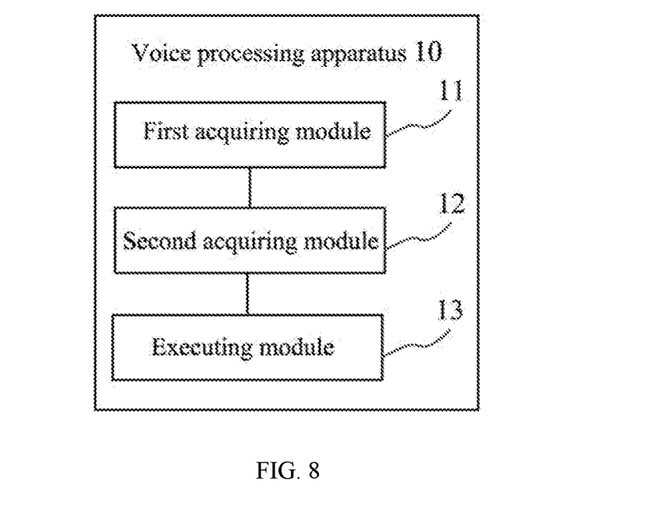
FIG. 8 is a schematic structural diagram of a voice processing apparatus according to an embodiment of the present disclosure.

FIG. 8 is a schematic structural diagram of a voice processing apparatus according to an embodiment of the present disclosure. Referring to FIG. 8, the voice processing apparatus 10 may include a first acquiring module 11, a second acquiring module 12, and an executing module 13, where the first obtaining module 11 is configured to acquire first voice information;

the second obtaining module 12 is configured to acquire response information corresponding to the first voice information; and The executing module 13 is configured to perform an operation corresponding to the response information according to a type of the response information, where the type of the response information is at least one of a voice type, a text type, an image type, a video type, and a program operation type.

The voice processing apparatus according to the embodiment of the present disclosure may perform the technical solution shown in the above method embodiments, the implementation principles and the advantage effects thereof are similar, and details are not described herein again.

In a possible implementation, the first acquiring module 11 is specifically configured to: acquire the first voice information through a first execution object;

the second obtaining module 12 is configured to acquire the response information corresponding to the first voice information through a second execution object, where the first execution object and the second execution object execute in parallel; and the executing module 13 is specifically configured to perform the operation corresponding to the response information according to the type of the response information through the second execution object.

In a possible implementation, the first execution object is a first thread, and the second execution object is a second thread.

In a possible implementation, the first execution object is a first hardware processing component, and the second execution object is a second hardware processing component.

Figure 9:
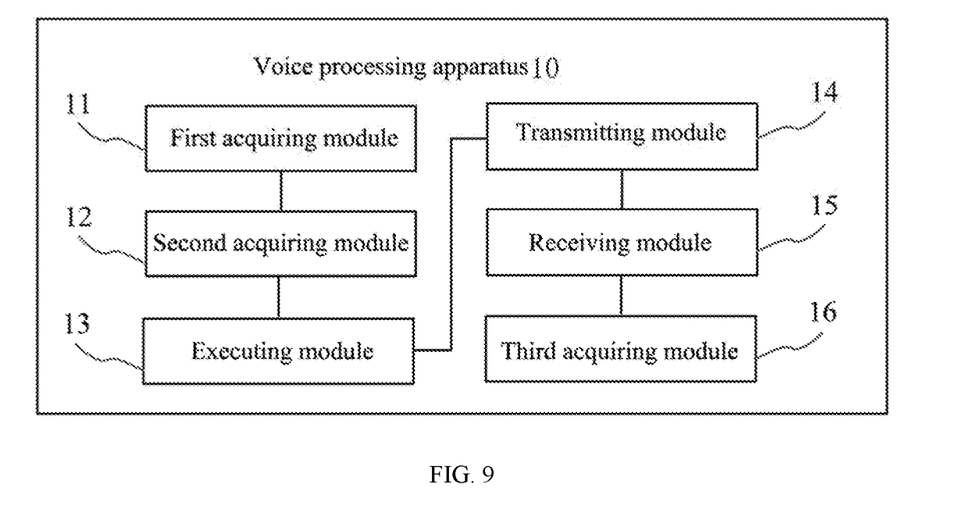
FIG. 9 is a schematic structural diagram of another voice processing apparatus according to an embodiment of the present disclosure.

FIG. 9 is a schematic structural diagram of another voice processing apparatus according to an embodiment of the present disclosure. On the basis of the embodiment shown in FIG. 8, referring to FIG. 9, the voice processing apparatus 10 further includes a transmitting module 14 and a receiving module 15, where the transmitting module 14 is configured to transmit request information to a server, where the request information includes voice representation information, and the voice representation information is determined according to the first voice information; and the receiving module 15 is configured to receive the response information transmitted by the server.

In a possible implementation, the voice representation information includes the first voice information; and correspondingly, the response information is determined obtained by the server according to the first voice information.

In a possible implementation, the apparatus further includes a third acquiring module 16, where the third acquiring module 16 is configured to acquire text information and an audio characteristic of the first voice information before the terminal device transmits the request information to the server; and correspondingly, the voice representation information includes the text information and the audio characteristic; the response information is determined by the server according to the text information and the audio characteristic.

In a possible implementation, the audio characteristic includes at least one of a voiceprint, a volume, a length, a sound wave amplitude, and a sound wave frequency of the first voice information.

In a possible implementation, the second acquiring module 12 is specifically configured to:

determine whether the first voice information is a real user statement through the second execution object; and generate the response information through the second execution object when it is determined that the first voice information is a real user statement.

In a possible implementation, the second acquiring module 12 is specifically configured to:

acquire characteristic information of the first voice information through the second execution object, where the characteristic information includes at least one of the following: an audio characteristic of the first voice information, a text characteristic of the first voice information, text information of the first voice information, context information of the first voice information, and an interaction behavior characteristic of a user, where the interaction behavior characteristic is configured to indicate a behavior characteristic of the user inputting the voice information in the terminal device;

acquire a probability that the first voice information is a real user statement according to the characteristic information of the first voice information; and determine whether the first voice information is a real user statement according to the probability.

In a possible implementation, the executing module 13 is specifically configured to:

when the type of the response information is a voice type, play the response information of the voice type;

when the type of the response information is a text type or an image type, display the response information of the text type or the image type;

when the type of the response information is a video type, play the response information of the video type; and when the type of the response information is a program operation type, perform a program operation corresponding to the response information.

The voice processing apparatus according to the embodiment of the present disclosure may perform the technical solution shown in the above method embodiments, the implementation principles and the advantage effects thereof are similar, and details are not described herein again.

Figure 10:
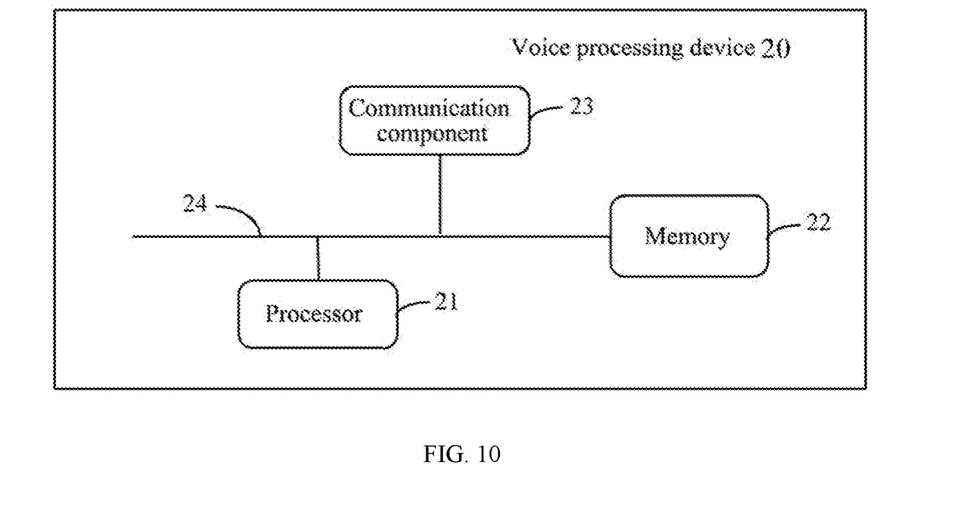
FIG. 10 is a schematic structural diagram of hardware of a voice processing apparatus according to an embodiment of the present disclosure.

FIG. 10 is a schematic structural diagram of hardware of a voice processing device according to an embodiment of the present disclosure. As shown in FIG. 10, the voice processing device 20 includes at least one processor 21 and a memory 22. In an embodiment, the voice processing device 20 further includes a communication component 23. The processor 21, the memory 22, and the communication component 23 are connected through a bus 24.

In a specific implementation process, the at least one processor 21 executes a computer executed instruction stored by the memory 22 to cause the at least one processor 21 to execute the above voice processing method.

For a specific implementation process of the processor 21, reference may be made to the above method embodiment, the implementation principles and technical effects thereof are similar, and details are not described herein again.

In the above embodiment shown in FIG. 10, it should be understood that the processor may be a Central Processing Unit (CPU for short), or other general purpose processor, Digital Signal Processor (DSP for short), and Application Specific Integrated Circuit (ASIC for short) or the like. The general purpose processor may be a microprocessor, or the processor may also be any conventional processor or the like. The steps of the method disclosed in combination with the present disclosure may be directly embodied as executed by the hardware processor or by a combination of hardware and software modules in the processor.

The memory may include high speed RAM memory, and may also include non-volatile memory NVM, such as at least one disk memory.

The bus may be an Industry Standard Architecture (ISA) bus, a Peripheral Component (PCI) bus, or an Extended Industry Standard Architecture (EISA) bus. The bus can be divided into an address bus, a data bus, a control bus, or the like. For ease of representation, the bus in the drawings of the present application is not limited to only one bus or one type of the bus.

The present application also provides a computer readable storage medium, the computer readable storage medium stores a computer executed instruction therein, and a processor, when executes the computer executed instruction, implements the above voice processing methods.

The above computer readable storage medium may be implemented by any type of volatile or non-volatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk. The readable storage medium can be any available medium that can be accessed by a general purpose or special purpose computer.

An exemplary readable storage medium is coupled to the processor to enable the processor to read information from the readable storage medium and write information into the readable storage medium. Of course, the readable storage medium may also be a component of the processor. The processor and the readable storage medium may be located in an Application Specific Integrated Circuit (ASIC). Of course, the processor and the readable storage medium may also exist as discrete components in the device.

The division of the unit is only a logical function division, and there may be other division ways in actual implementation, for example, multiple units or components may be combined or be integrated into another system, or some features may be ignored or not executed. In addition, coupling or direct coupling or communication connection shown or discussed herein may be an indirect coupling or communication connection through some interfaces, apparatuses or units, and may be electrical, mechanical or otherwise.

The units described as separate components may or may not be physically separated, and the components displayed as units may or may not be physical units, that is, they may be located in one place, or may be distributed onto multiple network units. Some or all of the units may be selected according to actual needs for the purpose of implementing the solution of the present embodiment.

In addition, each functional unit in each embodiment of the present disclosure may be integrated into one processing unit, or each unit may physically exist separately, or two or more units may be integrated into one unit.

The functions may be stored in a computer readable storage medium if implemented in the form of a software functional unit, and sold or used as a standalone product. Based on such understanding, the technical solution of the present disclosure, in essence, or the part contributing to the existing technology or the part of the technical solution can be embodied in the form of a software product, which is stored in a storage medium and includes a number of instructions for enabling a computer device (which may be a personal computer, a server, or a network device, or the like) to perform all or part described in the steps of the methods in various embodiments of the present disclosure. The foregoing storage medium includes various media that can store program code, such as a U disk, a mobile hard disk, a Read-Only Memory (ROM), a Random Access Memory (RAM), a magnetic disk, or an optical disk, or the like.

It will be understood by those skilled in the art that all or part of the steps for implementing the above method embodiments may be accomplished by hardware related to the program instructions. The aforementioned program can be stored in a computer readable storage medium. The program, when executed, performs the steps including the foregoing method embodiments; while the foregoing storage medium includes various medium that can store program codes, such as a ROM, a RAM, a magnetic disk, or an optical disk, or the like.

Finally, it should be noted that the above embodiments are merely intended for describing, rather than limiting, the technical solutions of the present disclosure; although the present disclosure has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present disclosure.

What is claimed is:

1. A voice processing method, comprising:
    acquiring, by a terminal device, first voice information; and
    acquiring, by the terminal device, response information corresponding to the first voice information, and performing an operation corresponding to the response information according to a type of the response information, wherein the type of the response information is at least one of a voice type, a text type, an image type, a video type, and a program operation type;
    wherein the acquiring, by a terminal device, first voice information, comprises:
    acquiring, by the terminal device, the first voice information through a first execution object; and
    the acquiring, by the terminal device, response information corresponding to the first voice information, and performing an operation corresponding to the response information according to a type of the response information, comprises:
    acquiring, by the terminal device, the response information corresponding to the first voice information through a second execution object, and performing the operation corresponding to the response information according to the type of the response information through the second execution object, wherein the first execution object and the second execution object execute in parallel.

2. The method according to claim 1, wherein the first execution object is a first thread, and the second execution object is a second thread; or the first execution object is a first hardware processing component, and the second execution object is a second hardware processing component.

3. The method according to claim 1, wherein the acquiring, by the terminal device, the response information corresponding to the first voice information through a second execution object, comprises:
    transmitting, by the terminal device, request information to a server, wherein the request information comprises voice representation information, and the voice representation information is determined according to the first voice information; and
    receiving, by the terminal device, the response information transmitted by the server.

4. The method according to claim 3, wherein the voice representation information comprises the first voice information; and
    correspondingly, the response information is determined by the server according to the first voice information.

5. The method according to claim 3, before the transmitting, by the terminal device, request information to a server, further comprising:
    acquiring, by the terminal device, text information and an audio characteristic of the first voice information;
    correspondingly, the voice representation information comprises the text information and the audio characteristic; the response information is determined by the server according to the text information and the audio characteristic; wherein
    the audio characteristic comprises at least one of a voiceprint, a volume, a length, a sound wave amplitude, and a sound wave frequency of the first voice information.

6. The method according to claim 1, wherein the acquiring, by the terminal device, the response information corresponding to the first voice information through a second execution object, comprises:
    determining, by the terminal device, whether the first voice information is a real user statement through the second execution object; and
    when the terminal device determines that the first voice information is a real user statement, generating, by the terminal device, the response information through the second execution object.

7. The method according to claim 6, wherein the determining, by the terminal device, whether the first voice information is a real user statement through the second execution object, comprises:
    acquiring, by the terminal device, characteristic information of the first voice information through the second execution object, wherein the characteristic information comprises at least one of the following: an audio characteristic of the first voice information, a text characteristic of the first voice information, text information of the first voice information, context information of the first voice information, and an interaction behavior characteristic of a user, wherein the interaction behavior characteristic is configured to indicate a behavior characteristic of the user inputting voice information in the terminal device;
  acquiring, by the terminal device, a probability that the first voice information is a real user statement according to the characteristic information of the first voice information; and
  determining, by the terminal device, whether the first voice information is a real user statement according to the probability.

8. The method according to claim 1, wherein the performing, by the terminal device, the operation corresponding to the response information according to the type of the response information through the second execution object, comprises:
  when the type of the response information is a voice type, playing, by the terminal device, the response information of the voice type;
  when the type of the response information is a text type or an image type, displaying, by the terminal device, the response information of the text type or the image type;
  when the type of the response information is a video type, playing, by the terminal device, the response information of the video type; and
  when the type of the response information is a program operation type, performing, by the terminal device, a program operation corresponding to the response information.

9. A voice processing apparatus, comprising: at least one processor and a memory; wherein the memory stores a computer executed instruction; and the at least one processor, when executing the computer executed instruction stored in the memory, is configured to:
  acquire first voice information;
  acquire response information corresponding to the first voice information; and
  perform an operation corresponding to the response information according to a type of the response information, wherein the type of the response information is at least one of a voice type, a text type, an image type, a video type, and a program operation type;
  wherein the at least one processor is further configured to:
  acquire the first voice information through a first execution object;
  acquire the response information corresponding to the first voice information through a second execution object, wherein the first execution object and the second execution object execute in parallel; and
  perform the operation corresponding to the response information according to the type of the response information through the second execution object.

10. The apparatus according to claim 9, wherein the first execution object is a first thread, and the second execution object is a second thread; or the first execution object is a first hardware processing component, and the second execution object is a second hardware processing component.

11. The apparatus according to claim 9, wherein the at least one processor is further configured to:
  transmit request information to a server, wherein the request information comprises voice representation information, and the voice representation information is determined according to the first voice information; and
  receive the response information transmitted by the server.

12. The apparatus according to claim 11, wherein the voice representation information comprises the first voice information; and
  correspondingly, the response information is determined by the server according to the first voice information.

13. The apparatus according to claim 11, wherein the at least one processor is further configured to:
  acquire text information and an audio characteristic of the first voice information before the terminal device transmits the request information to the server; and
  correspondingly, the voice representation information comprises the text information and the audio characteristic; the response information is determined by the server according to the text information and the audio characteristic.

14. The apparatus according to claim 13, wherein the audio characteristic comprises at least one of a voiceprint, a volume, a length, a sound wave amplitude, and a sound wave frequency of the first voice information.

15. The apparatus according to claim 9, wherein the at least one processor is further configured to:
  determine whether the first voice information is a real user statement through the second execution object; and
  generate the response information through the second execution object when it is determined that the first voice information is a real user statement.

16. The apparatus according to claim 15, wherein the at least one processor is further configured to:
  acquire characteristic information of the first voice information through the second execution object, wherein the characteristic information comprises at least one of the following: an audio characteristic of the first voice information, a text characteristic of the first voice information, text information of the first voice information, context information of the first voice information, and an interaction behavior characteristic of a user, wherein the interaction behavior characteristic is configured to indicate a behavior characteristic of the user inputting voice information in the terminal device;
  acquire a probability that the first voice information is a real user statement according to the characteristic information of the first voice information; and
  determine whether the first voice information is a real user statement according to the probability.

17. The apparatus according to claim 9, wherein the at least one processor is further configured to:
  when the type of the response information is a voice type, play the response information of the voice type;
  when the type of the response information is a text type or an image type, display the response information of the text type or the image type;
  when the type of the response information is a video type, play the response information of the video type; and
  when the type of the response information is a program operation type, perform a program operation corresponding to the response information.

18. A non-transitory computer readable storage medium, wherein the non-transitory computer readable storage medium stores a computer executed instruction therein, and a processor, when executes the computer executed instruction, implements the voice processing method according to claim 1.

\* \* \* \* \*